United States Patent
Patel et al.

(10) Patent No.: US 12,360,810 B2
(45) Date of Patent: Jul. 15, 2025

(54) SYSTEM AND METHOD FOR DISTRIBUTED MANAGEMENT OF CONFIGURABLE HARDWARE TO SATISFY USER INTENT

(71) Applicant: Dell Products L.P., Round Rock, TX (US)

(72) Inventors: Dharmesh M. Patel, Round Rock, TX (US); Lucas A. Wilson, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 457 days.

(21) Appl. No.: 18/152,227

(22) Filed: Jan. 10, 2023

(65) Prior Publication Data

US 2024/0231921 A1    Jul. 11, 2024

(51) Int. Cl.
G06F 9/50    (2006.01)

(52) U.S. Cl.
CPC .................. G06F 9/5027 (2013.01)

(58) Field of Classification Search
None
See application file for complete search history.

(56) References Cited

U.S. PATENT DOCUMENTS

| | | |
|---|---|---|
| 8,024,225 B1 | 9/2011 | Sirota et al. |
| 8,750,231 B1 | 6/2014 | Martini |
| 9,531,607 B1 | 12/2016 | Pai et al. |
| 10,025,653 B2 | 7/2018 | Goldstein et al. |
| 10,089,676 B1 | 10/2018 | Gupta et al. |
| 10,860,587 B2 | 12/2020 | Koukoumidis et al. |
| 11,036,554 B1 | 6/2021 | Prock et al. |
| 11,132,457 B2 | 9/2021 | Spektor et al. |
| 11,159,646 B1 | 10/2021 | Singh |
| 11,269,872 B1 | 3/2022 | Moo et al. |

(Continued)

FOREIGN PATENT DOCUMENTS

| | | |
|---|---|---|
| CN | 114730269 A | 7/2022 |
| KR | 20110008272 A | 1/2011 |

(Continued)

OTHER PUBLICATIONS

"Monitoring for DPU capacity planning", AWS Glue, Accessed Sep. 6, 2022, Web Page <https://docs.aws.amazon.com/glue/latest/dg/monitor-debug-capacity.html> (7 Pages).

*Primary Examiner* — Adam Lee
(74) *Attorney, Agent, or Firm* — WOMBLE BOND DICKINSON (US) LLP

(57) ABSTRACT

Methods and systems for managing distributed systems are disclosed. The distributed systems may include any number of data processing systems that may contribute to the functionality of the distributed system. To contribute to the functionality of the distributed system, each of the data processing systems may need to be configured to positively contribute to one or more functions. To manage configuration of data processing system, a distributed control plane may be utilized that vests decision making authority at different levels within a hierarchy. The distributed control plane may utilize an intermediate representation of intent of users and through which flexibility of implementation may be maintained.

20 Claims, 9 Drawing Sheets

(56) References Cited

U.S. PATENT DOCUMENTS

| | | |
|---|---|---|
| 11,323,317 B1 | 5/2022 | Levin et al. |
| 11,501,763 B2 | 11/2022 | Panchamgam et al. |
| 11,522,976 B1 | 12/2022 | Baker |
| 11,632,315 B1 | 4/2023 | Sawal et al. |
| 11,706,289 B1 | 7/2023 | Patel et al. |
| 11,831,706 B1 | 11/2023 | Patel et al. |
| 11,841,846 B1 | 12/2023 | Kothari et al. |
| 2007/0217335 A1 | 9/2007 | Jayaraman et al. |
| 2008/0208672 A1 | 8/2008 | Van Riel et al. |
| 2009/0010264 A1 | 1/2009 | Zhang |
| 2009/0150523 A1* | 6/2009 | Gray ............... H04L 67/04 709/220 |
| 2010/0017506 A1 | 1/2010 | Fadell |
| 2011/0238498 A1 | 9/2011 | Hassan et al. |
| 2011/0275344 A1 | 11/2011 | Momtahan et al. |
| 2012/0003923 A1 | 1/2012 | Pazos et al. |
| 2012/0304191 A1 | 11/2012 | Morgan |
| 2014/0059227 A1 | 2/2014 | Esserman et al. |
| 2014/0181285 A1 | 6/2014 | Stevens et al. |
| 2014/0187199 A1 | 7/2014 | Yan et al. |
| 2014/0297521 A1 | 10/2014 | Das et al. |
| 2014/0357289 A1 | 12/2014 | Smith et al. |
| 2016/0132310 A1 | 5/2016 | Koushik et al. |
| 2016/0321097 A1 | 11/2016 | Zhu et al. |
| 2016/0337474 A1 | 11/2016 | Rao |
| 2017/0006117 A1 | 1/2017 | Kafle et al. |
| 2017/0063946 A1 | 3/2017 | Quan et al. |
| 2019/0171438 A1 | 6/2019 | Franchitti |
| 2019/0173757 A1 | 6/2019 | Hira et al. |
| 2019/0220315 A1 | 7/2019 | Vallala et al. |
| 2019/0347181 A1 | 11/2019 | Cranfill et al. |
| 2019/0384893 A1 | 12/2019 | Suda |
| 2020/0186619 A1 | 6/2020 | Huber et al. |
| 2020/0236116 A1 | 7/2020 | Bower et al. |
| 2020/0363959 A1 | 11/2020 | Kesavan et al. |
| 2021/0124744 A1 | 4/2021 | Gladwin et al. |
| 2021/0182940 A1 | 6/2021 | Gupta et al. |
| 2021/0200486 A1 | 7/2021 | Mizui |
| 2021/0360074 A1 | 11/2021 | Long |
| 2021/0360083 A1 | 11/2021 | Duggal et al. |
| 2021/0397308 A1 | 12/2021 | Rahman et al. |
| 2022/0121623 A1 | 4/2022 | Lyske |
| 2022/0124009 A1 | 4/2022 | Metsch et al. |
| 2022/0164838 A1 | 5/2022 | Wang |
| 2022/0237232 A1 | 7/2022 | Quamar et al. |
| 2022/0261406 A1 | 8/2022 | Bhuiyan et al. |
| 2022/0318423 A1 | 10/2022 | Shu et al. |
| 2023/0072837 A1 | 3/2023 | Brown et al. |
| 2023/0111811 A1 | 4/2023 | Tran |
| 2023/0128497 A1 | 4/2023 | Vijayan et al. |
| 2023/0169080 A1 | 6/2023 | Iyer et al. |
| 2023/0206329 A1 | 6/2023 | Cella et al. |
| 2023/0237059 A1 | 7/2023 | Zweig et al. |
| 2023/0297540 A1 | 9/2023 | Khan et al. |
| 2023/0402766 A1 | 12/2023 | Garyantes et al. |
| 2023/0409584 A1 | 12/2023 | Venkatesan et al. |

FOREIGN PATENT DOCUMENTS

| | | |
|---|---|---|
| KR | 20130015327 A | 2/2013 |
| WO | 2012173604 A2 | 12/2012 |

* cited by examiner

SYSTEM AND METHOD FOR DISTRIBUTED MANAGEMENT OF CONFIGURABLE HARDWARE TO SATISFY USER INTENT

FIELD OF THE DISCLOSED EMBODIMENTS

Embodiments disclosed herein relate generally to distributed management. More particularly, embodiments disclosed herein relate to systems and methods for distributed control plane management of distributed systems.

BACKGROUND

Computing devices may store data and used stored data. For example, computing devices may utilize data when providing computer implemented services. The ability of computing devices to perform different types of computer implemented services may depend on the types and quantities of available computing resources.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
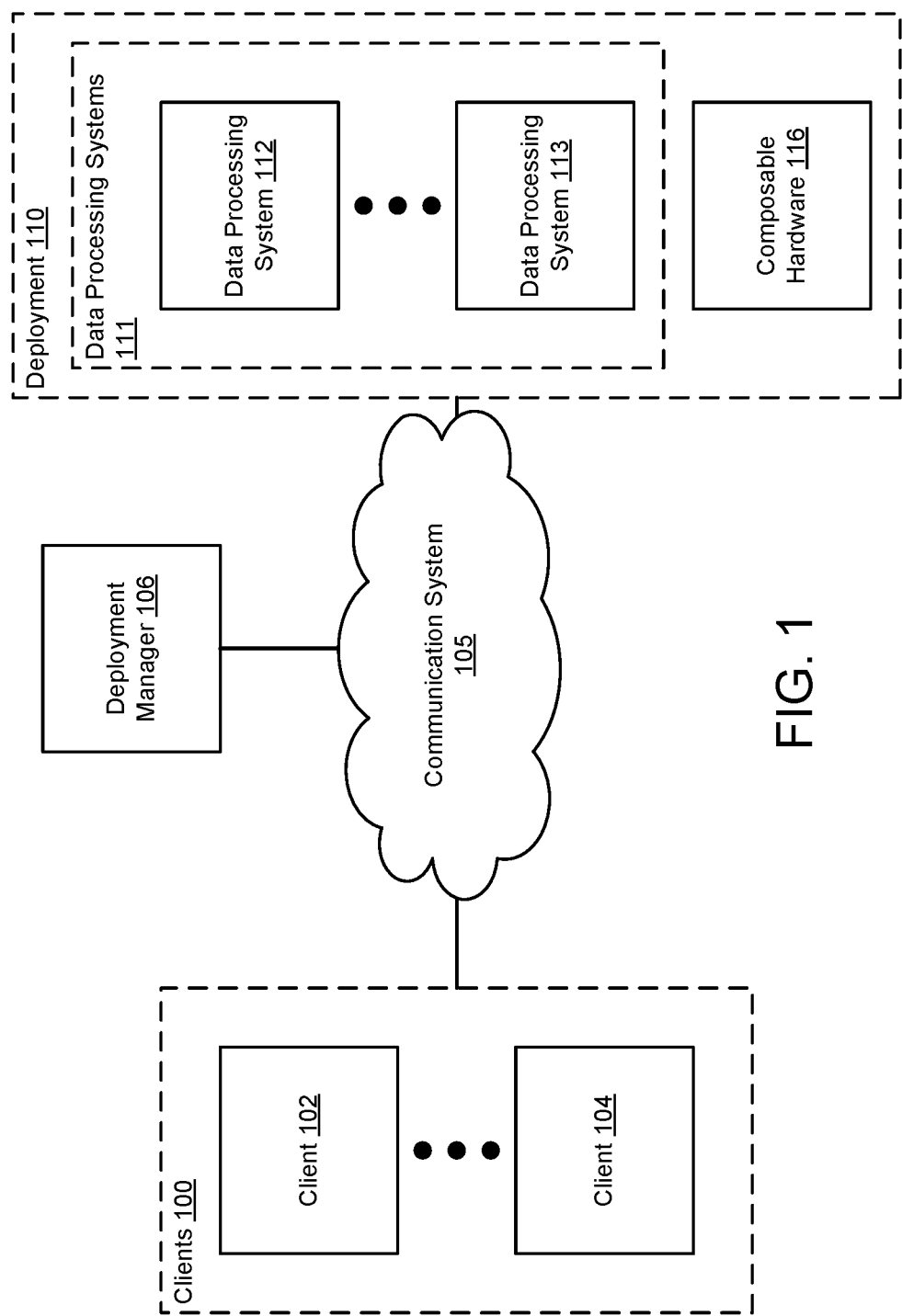
FIG. 1 shows a block diagram illustrating a system in accordance with an embodiment.

Various embodiments and aspects disclosed herein will be described with reference to details discussed below, and the accompanying drawings will illustrate the various embodiments. The following description and drawings are illustrative of the embodiments disclosed herein and are not to be construed as limiting the embodiments disclosed herein. Numerous specific details are described to provide a thorough understanding of various embodiments of embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing a distributed system. The distributed system may include any number of data processing systems that may contribute to the functionality of the distributed system. To contribute to the functionality of the distributed system, each of the data processing systems may need to be configured in a manner that allows the data processing systems to contribute to providing one or more functionalities.

To manage configuration of the data processing system, a distributed control plane may be utilized. The distributed control plane may vest decision making authority at different levels of a hierarchy used to manage the data processing systems.

The distributed control plane may allow management entities to receive information regarding the intents of users that may desire to receive services from the data processing systems, and decide on roles to be implemented to meet the intents of the users. The roles may be defined by an intermediate representation that does not rigidly express how each of the data processing systems is to be configured, the software to be hosted by the data processing systems, etc. Rather, the roles may define metrics usable to evaluate the capability of a data processing system with a particular configuration to take on a role.

The intermediate representation may allow groups of data processing systems (e.g., a deployment) to establish their respective configurations for providing services requested by a user. As part of the process for establishing the configurations for the data processing systems, the data processing systems may self-evaluate their ability to provide the roles and level of dependence on composable hardware in providing the roles. The data processing systems may be selected to perform the roles established by the intermediate representation preferentially towards the data processing systems that are less likely to use composable hardware to provide the roles.

By doing so, embodiments disclosed herein may improve the efficiency of use of limited computing resources through increased flexibility in the configurations that may be used to provide some of the services for a requested functionality. For example, by conserving use of composable hardware resources, roles that may otherwise be challenging to implement may be more easily implemented through use of the conserved composable hardware. Thus, embodiments disclosed herein may address, in addition to others, the limited availability of computing resources. The disclosed embodiments may do so by more efficiently marshaling the limited computing resources for providing the services when compared to top-down system management and/or rigid configuration expectations.

In an embodiment, a computer-implemented method for managing services provided using data processing systems is provided. The method may include obtaining an intermediate representation of roles to facilitate a desired use of the data processing systems; obtaining, using a local control plane for a portion of the data processing systems and the intermediate representation, self-reported role fit data from the portion of the data processing systems, the self-reported role fit data indicating: estimates of an ability of each of the portion of the data processing systems to fulfill each of the roles, and a level of dependence on composable hardware for the estimates; establishing, based on the role fit data, a proposed deployment plan for services to be provided by each of the portion of the portion of the data processing systems, the proposed deployment plan being established through preferential selection for a set of the portion of the data processing systems with a level of dependence on the composable hardware for the estimates that falls below a threshold for the roles; instantiating, based on the proposed deployment plan, subscriptions for the data processing systems to implement the roles to facilitate the desired use to obtain subscribed data processing systems; and providing the desired use of the data processing systems to a client using the subscribed data processing systems.

The method may also include negotiating, with the portion of the data processing systems and using the proposed deployment plan, agreements with the portion of the data processing systems to implement at least one of the roles. The subscriptions may also be instantiated based on the agreements.

The method may further include obtaining intent data from a client, the intent data indicating a desired use of the data processing systems. The intermediate representation of the roles may be obtained based on the intent data.

Establishing the proposed deployment plan may include, for a role of the roles: ranking the data processing systems of the portion of the data processing systems based on the estimated ability of each of the data processing systems for the role; adjusting the ranking based on the levels of dependence corresponding to each of the estimated ability to obtain a revised ranking; and selecting one of the data processing systems of the portion of the data processing systems based on the revised ranking.

Adjusting the rankings may include excluding a subportion of the portion of the data processing systems associated with estimated abilities that fall below a threshold to obtain the revised rankings.

Adjusting the rankings may also include, for a ranking of the rankings of the data processing systems of the portion of the data processing systems: decrementing the ranking by an amount based on the level of dependence of the levels of dependence corresponding to the estimated ability of the data processing system.

Obtaining the self-reported role fit data may include providing, to the portion of the data processing systems, the roles; self-evaluating, by the portion of the data processing systems, first viability for each role based on static hardware; self-evaluating, by the portion of the data processing systems, second viability for each role based on static hardware and composable hardware; and providing, by the portion of the data processing systems, the self-reported role fit data based on the first viability for each of the roles and the second viability for each of the roles.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may facilitate performance of workloads (e.g., computer-implemented workloads performed by executing computing instructions with at least one processor of one or more data processing systems). The system may include, but is not limited to, one or more clients 100, deployment 110, and a communication system 105 that facilitates operable connections between all, or a portion, of the components illustrated in FIG. 1. Each of these components is discussed below.

All, or a portion, of clients 102-104 may provide services to users of clients 100 and/or to other devices operably connected to clients 100. To provide services (e.g., computer implemented services) to users or other devices, clients 100 may utilize services provided by deployment 110. Deployment 110 may provide any type and quantity of computer implemented services. The computer implemented services provided by deployment 110 may be specified by clients 100 and/or other entities.

To provide the computer implemented services to clients 100, deployment 110 may include any number of data processing systems 112-113. The data processing systems may each provide respective computer implemented services. The data processing systems may provide similar and/or different computer implemented services. All, or a portion, of the computer implemented services may be provided cooperatively by multiple data processing systems while other computer implemented services may be provided independently by various data processing systems.

In aggregate, the computer implemented services provided by deployment 110 may provide one or more overall solutions (e.g., a solution architecture, a solution service, etc.). An overall solution may be provided when deployment 110 provides one or more predetermined services.

For example, consider a scenario where deployment 110 provides tiered data storage services to clients 100. To provide the tiered data storage services, data processing systems 112-113 may need to (i) intake data, (ii) select a storage location for data, (iii) preprocess the data prior to storage (e.g., deduplication), (iv) store the data in the storage location, and (v) migrate the data between storage locations so as to properly tier the data as its relevance/importance changes over time. To provide functionalities (i)-(v), various data processing systems of deployment 110 may need to be appropriately configured (e.g., specific hardware settings, software settings, firmware, operating systems, service applications, etc.) with some data processing systems being configured differently.

However, depending on the capabilities of data processing systems 112-113, any of the data processing systems may not be able to be configured in accordance with a static or rigid specification. For example, any of the data processing systems may lack hardware or functionalities to provide certain services as part of a solution architecture, any of the hardware may already be in use for other types of services and may not be reconfigurable (e.g., without impacting the already-provided services), any of the data processing systems may lack certain software or may host software that may conflict with software specified for a static configuration, etc.

To provide for additional flexibility in configuration, any of data processing systems 111 may include functionality to dynamically add portions of composable hardware 116. Composable hardware 116 may include hardware which may be exposed to any of the data processing systems through smart network interface cards, data processing units, and/or other hardware (e.g., collectively referred to as "adapter hardware") of the data processing system. The composable hardware 116 may be presented to the data processing system as bare metal resources (e.g., by having the adapter hardware communicate with the compute complex of a data processing system in accordance with a bare metal communication scheme), but the adapter hardware may do so using any number of layers of virtualization, translation, and/or other types of abstraction.

However, the quantity of available composable hardware 116 may be limited, and using composable hardware 116 to provide services rather than hardware native to a data processing system may incur additional computational, bandwidth, and energy consumption overhead.

In general, embodiments disclosed herein relate to systems, methods, and devices for managing the configurations of data processing systems of a deployment to provide services desired by user of clients. The configurations of the data processing systems may be managed using an intermediate representation of roles that, when fulfilled, are likely to successfully effectuate an intent of a user that requests that a solution service or architecture (and/or other expression of intent) be provided.

Rather than specifying static or rigid configurations, the intermediate representation of the roles may be used to evaluate whether a data processing system may be configured in various manners to perform the roles. The intermediate representation of the roles may be used by a distributed control plane to identify and configure data processing systems to effectuate the intent of the user.

The representation of the roles may be used, for example, to identify performance metrics (or other types of information) usable to grade and/or otherwise rank the abilities of data processing systems to perform the roles. The grades, ranking, and/or other types of quantifications of ability to perform roles may be used to provisionally select which of the data processing systems to perform various roles.

When making the provisional selection, the types of hardware that will be used by the data processing systems to perform the role may be taken into account. Due to the limited quantity of and additional overhead for use of composable hardware 116, data processing systems that propose to perform roles without using composable hardware may be preferentially selected over data processing systems that proposed to perform roles using composable hardware.

The provisional selection may then be used to propose roles that each of the data processing systems may perform. The proposals may serve as a basis for negotiation regarding which data processing systems will perform the roles.

The negotiation process may, if impasses are reached, include modifying goals, expectations associated with services to be provided to the requestors, and/or preferences regarding use of composable hardware in performing roles. For example, if none of the data processing systems (that have reported the ability to perform a role without use of composable hardware) that have been provisionally selected to perform the role agree to take on the role, then the data processing systems that have reported the ability to perform a role with use of composable hardware may be requested to perform the role. If mutual agreements can be reached, then some data processing systems may be forced to accept the proposals.

Once agreements have been reached, the data processing systems may be configured to perform the roles through a subscription-based system. Once confirmed, the configured data processing systems may provide computer implemented services that are likely to meet an intent of a requestor. Refer to FIGS. 2A-2F for additional details regarding management of data processing systems to provide desired computer implemented services.

By doing so, embodiments disclosed herein may provide a system that is more likely to meet the intents of requestors while providing flexibility in deployment. By avoiding use of rigid configurations for roles, the system may facilitate distributed management of data processing systems. Accordingly, embodiments disclosed herein may provide an improved computing system that is able to provide desired services using a broader array of data processing systems with varying capabilities.

To provide the above-noted functionality, the system of FIG. 1 may include deployment manager 106. Deployment manager 106 may (i) obtain information (e.g., intents) regarding services to be provided to clients 100, (ii) generate intermediate representations based on the obtained information, (iii) distribute the intermediate representations to deployment 110 for implementation, (iv) store information (e.g., subscriptions) regarding some of the data processing systems of deployment 110 used to implement the services for clients 100, and/or (v) manage the portion of the data processing systems used to provide the services to ensure that the services are provided in a manner that meet the expectations of the users of clients 100. When doing so, deployment manager 106 may operate as a member of distributed control plane that extends down to data processing systems 111.

The distributed control plane may vest decision making authority, at least in part, at different levels within the distributed control plane. For example, deployment manager 106 may have authority to define an intermediate representation that data processing systems (e.g., 112-113) will implement. Other portions of the distributed control plane may have authority to decide on which roles different data processing systems will take on to provide the services on which the intermediate representation was based.

By implementing the distributed control plane in this manner, multiple instances of deployment manager 106 may independently manage provisioning of services without needing to maintain a map (or other types of representations) of the activities of the data processing systems of any number of deployments. For example, any number of instances of deployment manager 106 may independently process service requests from clients 100 without needing to coordinate with other instances of deployment manager 106 (at least for resource management purposes). By doing so, the distributed control plane may be able to manage services for larger numbers of clients using larger numbers of data processing systems (and/or virtualized/containerized/non-physical replicas of data processing systems).

Deployment 110 may include any number of data processing systems 111, and quantity of composable hardware 116, and/or other components. Deployment 110 may be implemented, for example, as a portion of a data center, public or private cloud, edge system, and/or other type of computing environment. Deployment 110 may be geographically separated from deployment manager 106 and/or clients 100.

Composable hardware 116, while illustrated as being part of deployment 110, may be entirely or in part separate from deployment 110. Composable hardware 116 may include any number of hardware components and adapter hardware usable to facilitate use of the hardware components by data processing systems 111.

Generally, deployment 110 may implement a portion of the distributed control plane. The portion of the distributed control plane implemented by deployment 110 may be responsible for providing services by implementing intermediate representations provided by deployment manager 106 and/or other members of other portions of the distributed control plane. To do so, the portion of the distributed control plane implemented by deployment 110 may (i) obtain information based on the intermediate representation, (ii) identify members of deployment 110 that may take on roles based on the information and the extent of reliance on composable hardware 116 to be able to take on those role, (iii) cooperatively decide which member of deployment 110 will take on each of the roles (and/or which group of members may take on roles in scenarios in which a role may require multiple data processing systems), (iv) configure the data processing systems based on the data processing systems elected to perform the roles through a subscription system, and (v) after configuration, initiate performance of computer implemented services. Refer to FIGS. 2B-2F for additional details regarding deployment 110.

Figure 3:
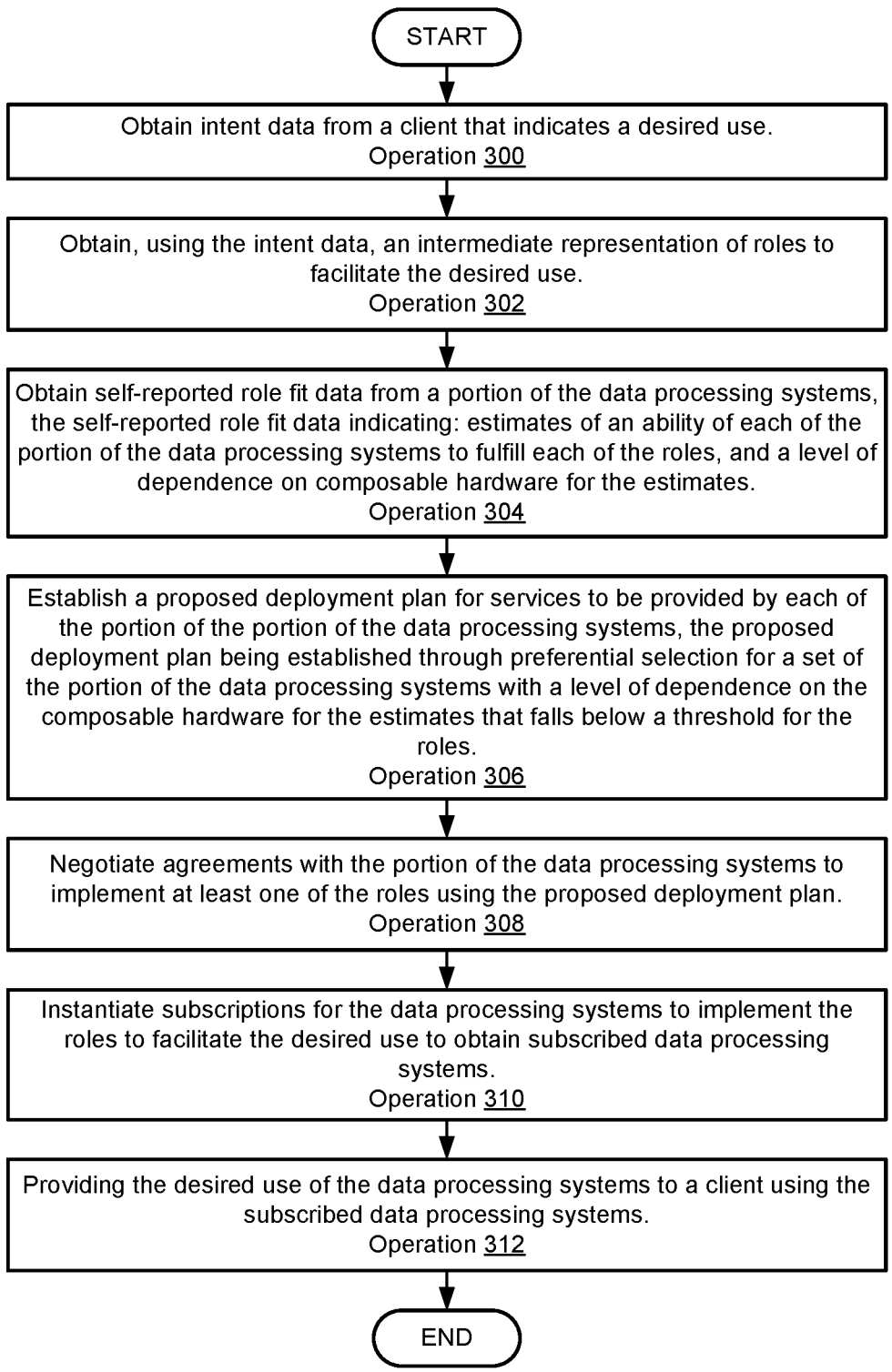
FIG. 3 shows a flow diagram illustrating a method of providing computer implemented services potentially with composable hardware in accordance with an embodiment.

While performing their functionalities, any of clients 100, deployment manager 106, and deployment 110 may perform all, or a portion, of the method illustrated in FIG. 3.

Any of clients 100, deployment manager, and deployment 110 may be implemented using a computing device such as a host or server, a personal computer (e.g., desktops, laptops, and tablets), a "thin" client, a personal digital assistant (PDA), a Web enabled appliance, or a mobile phone (e.g., Smartphone), or any other type of data processing device or system. For additional details regarding computing devices, refer to FIG. 4.

Communication system 105 may include one or more networks that facilitate communication between all, or a portion, of clients 100, deployment manager 106, and deployment 110. To provide its functionality, communication system 105 may be implemented with one or more wired and/or wireless networks. Any of these networks may be private, public, and/or may include the Internet. For example, clients 100 may be operably connected to one another via a local network which is operably connected to the Internet. Similarly, deployment 110 may be operably connected to one another via a second local network which is also operably connected to the Internet thereby allowing any of clients 100 and deployment 110 to communication with one another and/or other devices operably connected to the Internet. Clients 100, deployment 110, deployment manager 106, and/or communication system 105 may be adapted to perform one or more protocols for communicating via communication system 105.

While illustrated in FIG. 1 as including a limited number of specific components, a system in accordance with an embodiment may include fewer, additional, and/or different components than those illustrated therein.

As discussed above, the system of FIG. 1 may implement a control plane that manages resource data processing systems to provide computer implemented services. FIGS. 2A-2F show data flow diagrams in accordance with an embodiment disclosed herein. The data flow diagrams may show operation of an example system over time. For example, FIGS. 2A-2F may show flows of data and processes performed that may facilitate use of functionalities provided by deployments.

Figure 2A:
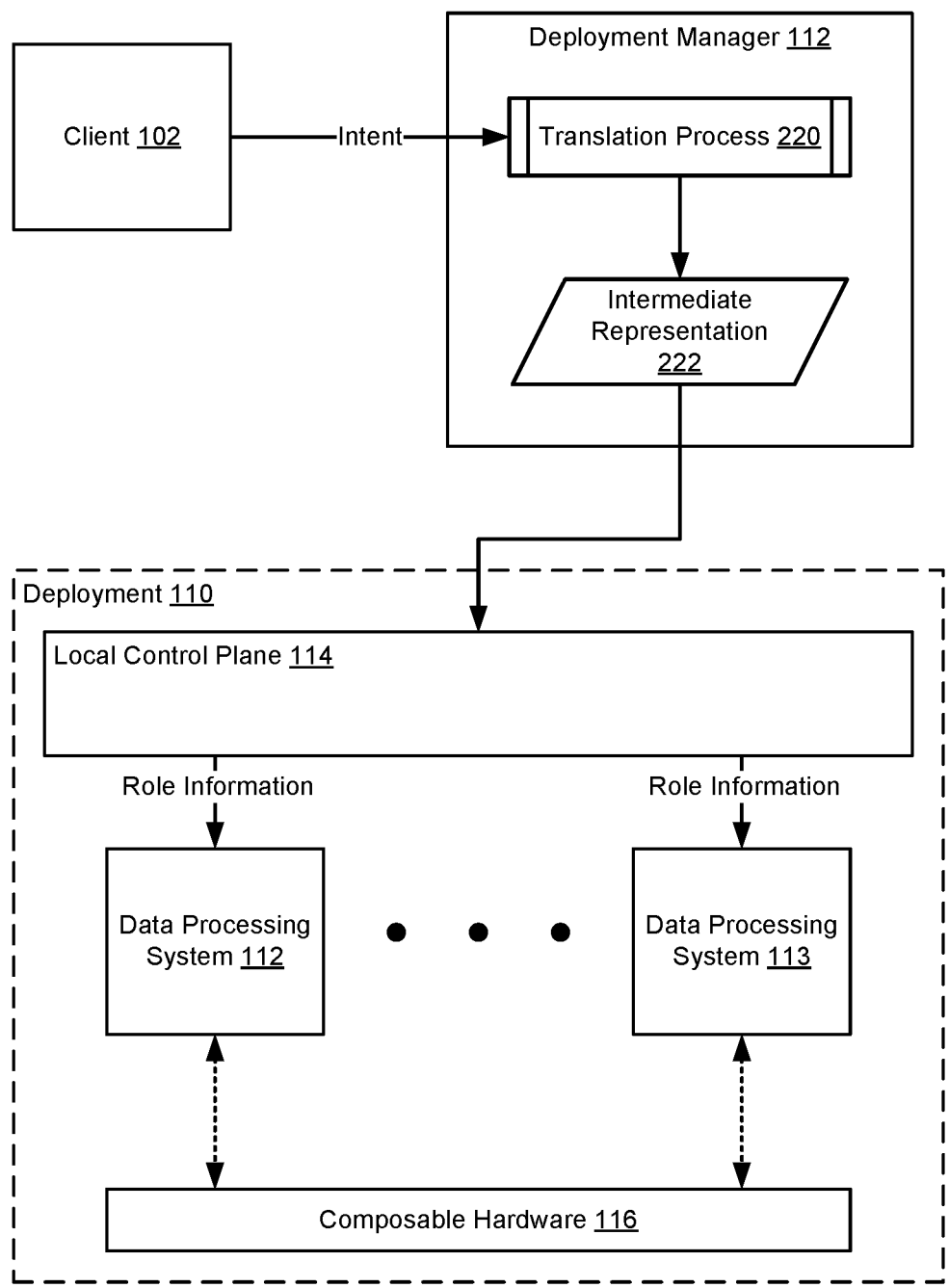
FIGS. 2A-2F show data flow diagrams illustrating data used and processing performed by a system in accordance with an embodiment.

Turning to FIG. 2A, a first data flow diagram in accordance with an embodiment is shown. To initiate use of a computer implemented service, client 102 may convey an intent to deployment manager 106. The intent may be conveyed by providing information indicating one or more functionalities that the user of client 102 desires to utilize. The intent may be conveyed by, for example, presentation of one or more graphical user interfaces to the user of client 102. The graphical user interfaces may indicate the functionalities that may be provided by deployment 110. The user may select the functionalities to be provided via the graphical user interfaces, thereby conveying an intent to deployment manager 106 regarding desired functionalities.

In addition to functionalities, various limits and/or other criteria for the functionalities (e.g., referred to as "service limits") may be provided by the user. The limits may specify, for example, financial limits regarding cost for the services, the extent of the provided functionalities such as numbers of devices to which the functionalities are to be provided or rates at which the functionalities are to be provided, and/or other types of limits.

Implementing any of the functionalities may require, for example, configuration of one or more hardware components of a data processing system and deployment and/or configuration of one or more software components (e.g., a "software stack") to the data processing system for the data processing system to be able to provide, at least in part, the respective functionalities. However, the functionalities may not require specific hardware components and configurations thereof, or a specific software stack. Rather, the functionalities may be considered as being provided effectively by various hardware and software, so long as various performance metrics may be met.

For example, if the functionality is to store and provide stored data, various types of storage devices and software layers for managing the stored data may all be capable of meeting the functionality of storing data and providing stored data. Rather than attempting to rigidly define hardware and software stacks that must be implemented to meet the intent of the user, an intermediate representation 222 based on the intent may be obtained.

Intermediate representation 222 may be obtained via translation process 220. Translation process 220 may take the intent from the user of client 102 and/or other types of information such as the service limits, and obtain one or more roles that, when provided, are likely to meet the intent of client 102. Intermediate representation may indicate the roles that are to be implemented based on the user's expressed intent.

The roles may be established via a lookup in a database or other process. For example, the database may include associations between functionalities, service limits, and roles. When a functionality and/or service limit is identified based on a user's expressed intent, one or more roles may be identified by performing the lookup in the database. As will be discussed in greater detail below, each of the roles may be associated with performance metrics usable to identify and/or rank data processing systems (e.g., 112-113) of deployment 110 with respect to their abilities to perform the roles.

Once obtained, intermediate representation 222 may be provided to local control plane 114 of deployment 110. Local control plane 114 may be a service that manages configuration of data processing systems 112-113 to provide services. Local control plane 114 may be hosted by another device (not shown) and/or may be implemented using a distributed services (e.g., hosted, in part, by each of the data processing systems).

Local control plane 114 may distribute role information for the roles defined by intermediate representation 222 to the data processing systems. The role information may include, for example, numbers and types of roles to be implemented by deployment 110.

Figure 2B:
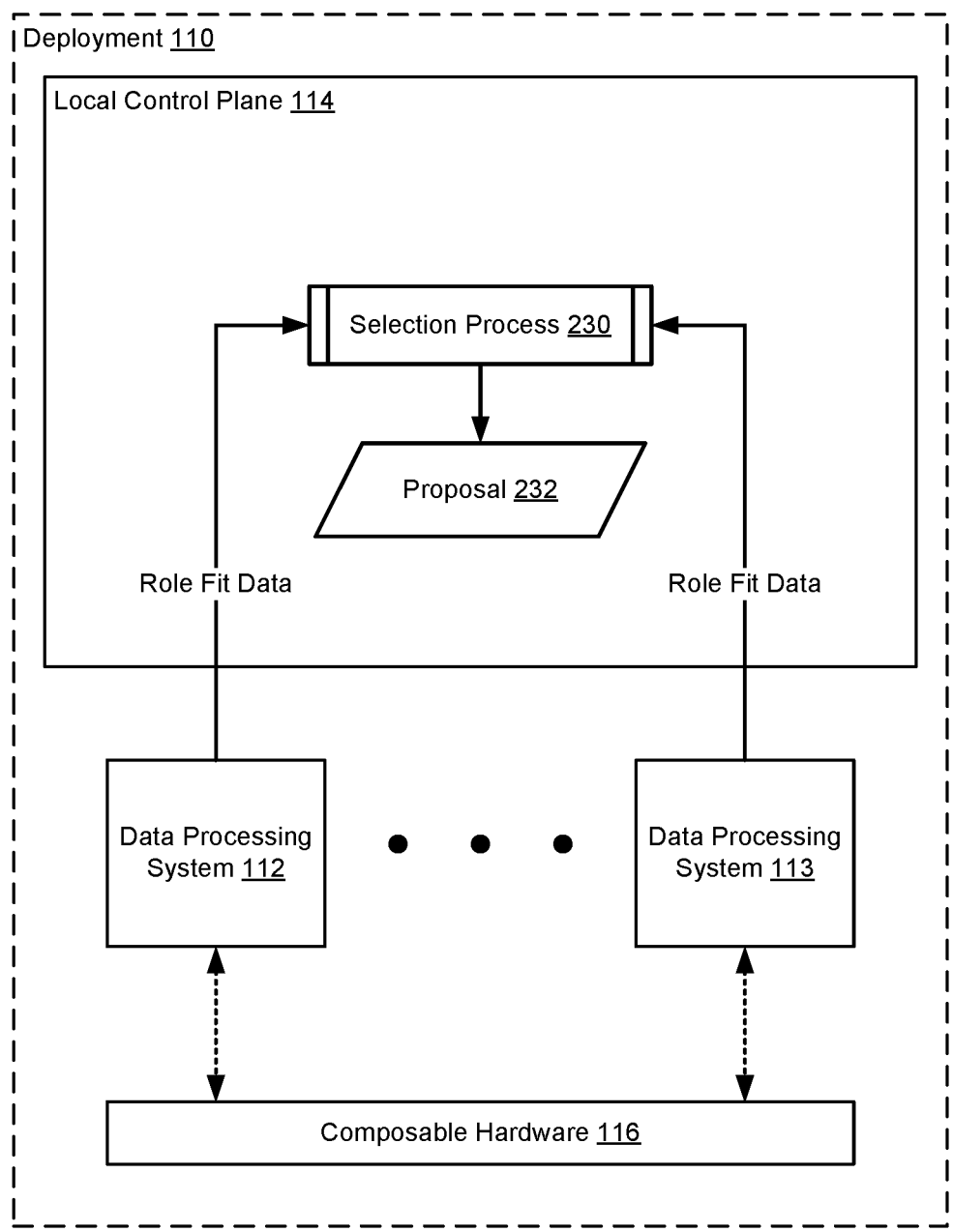

Turning to FIG. 2B, a second data flow diagram in accordance with an embodiment disclosed herein is shown. Each of data processing systems 112-113 may evaluate their capacities for performing the roles. To do so, data processing systems 112-113 may (i) identify hardware and/or software needed to perform the roles, (ii) compare their available hardware and/or software to the identified hardware and/or software to identify their capability to perform each of the roles, (iii) rank or otherwise grade their ability for each of the roles based on their capabilities to perform the roles, and/or (iv) provide role fit data to local control plane 114. The role fit data may indicate their self-report ability for each of the roles.

The data processing systems may rank or otherwise grade their ability for each role using the performance metrics associated with each role. The data processing systems may evaluate their performance for each of the performance metrics (e.g., through simulation, test implementation, or other processes), and compare their performance to the given performance metrics.

For example, returning to the example for data storage services, if a performance metric indicates completion of 100 storage transactions per second, a data processing system may temporarily deploy a software stack capable of performing the storage transactions and ingest a set of test storage transactions to identify a storage transactions rate per second by the data processing system. The data processing system may then compare the tested rate to the performance metric to identify whether and to what extent the data processing system is able to perform the role. For example, if the storage transaction rate of the data processing system was 120 storage transactions per second, then the data processing system may report in the role fit data that the data processing system is 120% capable of performing the role (e.g., 120/100 transactions per second). While described with respect to a single software stack, the data processing system may evaluate its performance with respect to any number of software stacks and/or hardware configurations (e.g., also referred to as "tested configurations") when evaluating its capability for performing the role. The resulting role fit data may include a report of the highest capability (for all of the tested configurations), an average capability (of the tested configurations, all of the capabilities for all of the tested configurations, limitations with respect to any of the tested configurations (e.g., whether the data processing system has sufficient free available hardware resources to support the tested configurations), and/or other information usable to appraise local control plane 114 of the capabilities of data processing systems 112-113.

The data processing systems that include functionality to use composable hardware 116 may be capable of taking on nearly any role through dynamic acquisition of some of composable hardware 116. For example, composable hardware 116 may include any number and type of hardware device. Consequently, when considering whether a data processing system is able to take on a role, the data processing system may view its hardware resources as including both the local hardware resources (e.g., native to the host data processing system) and the available hardware resources of composable hardware 116. Thus, if left unchecked, the data processing system that include the capability to dynamically acquire use of composable hardware 116 may always self-rate themselves as being capable of performing all of the roles.

However, due to the limited quantity of composable hardware 116, it may not be desirable to attempt to implement all of the roles using composable hardware 116. Implementing a role using composable hardware 116 may prevent the role being implemented by other data processing systems that may require use of composable hardware 116 to implement some roles. As will be discussed in greater detail below, to preserve flexibility in implementing roles, a data processing system capable of implementing a roles using native hardware may be preferentially selected for roles over data processing systems that require use of composable hardware 116 to implement the role.

While described with respect to testing for individual ability to perform roles, each of the data processing systems may also report in the role fit data their capability to perform roles in cooperation with other data processing systems. Like their individual abilities to perform roles, the distributed capability for role performance may be evaluated through cooperative testing with other data processing systems.

The resulting role fit data may indicate, for a given role, (i) a self-ranking of the ability of the data processing system to perform role based on its native hardware, (ii) a self-ranking of the ability of the data processing system to perform a role based on its native hardware and composable hardware 116 (e.g., through acquisition of use of some of composable hardware 116), (iii) a self-rank of the ability of a group of the data processing system to which the data processing below to perform the role (e.g., may also include sub-rankings for performing with and/or without use of composable hardware 116), (iv) information regarding an extent of reliance on composable hardware 116 for performing the roles, and/or (iv) other information reflecting the self-evaluated ability to perform a role.

The extent of the reliance may be quantified, for example, by comparing the self-evaluated ability of the data processing system to perform a role using native hardware versus the self-evaluated ability of the data processing system to perform the role using native hardware and composable hardware. The delta in level of ability between these two self-evaluations may be used as the extent of the reliance on composable hardware 116. For example, consider a role with performance metrics that require a data processing system to process 30 transactions per second. If the data processing system self-evaluates its ability as 20 transactions per second using only native hardware, and 40 transactions per second using native hardware and composable hardware, then the extent of reliance may be quantified, for example, as 0.5 (e.g., 20/40, if evaluated based on the delta between the two performance levels), ⅓ (e.g., 10/30, if evaluated based on the delta between the actual performance and the metric and the metric), and/or another quantification.

Local control plane 114 may perform selection process 230 using the role fit data to obtain proposal 232. Selection process 230 may parse the role fit data to identify which of data processing systems 112-113 is best able to perform the role. Selection process 230 may include rank ordering data processing systems for the roles based on the role fit data.

The rank ordering may be based on (i) the available hardware resources of each of the data processing systems, (ii) the magnitude of change to the existing hardware configurations and/or software hosted by each of the data processing systems, (iii) the self-reported ability of each data processing system to perform the role, and/or (iv) other factors. The rank ordering may be obtained using an objective function that takes into account the above factors and outputs a numerical value. The rank ordering may be established based on the numerical values obtained from the objective function for each of the data processing systems.

Once obtained, the rank ordering may be modified, for example, by excluding data processing systems that will use composable hardware 116 to perform the role, modifying the rankings of the data processing systems that will use composable hardware 116 to perform a role, etc. The rankings may be modified, for example, by decrementing the ranking of the data processing systems by an extent of their reliance on composable hardware 116.

Using the above example, the extent of reliance may be used to reduce a ranking (e.g., decrement) of a data processing system for a role. If the extent of the reliance for a data processing system is quantified as 0.5, then the rank for the data processing system (that proposes to use composable hardware 116) may be reduced based on the quantification. For example, the ranking may be reduced by recalculating the numerical value used as a basis for comparison to establish the ranking. In a scenario in which the numerical value is 20, the numerical value may be recalculated by reducing the numerical value based on the extent of the reliance (e.g., 20/(1+extent of reliance)). The recalculated numerical value may then be used to re-rank the data processing system that proposed to take on the role using composable hardware 116. By excluding or modifying the rankings, data processing system that only utilize native resources may be preferentially selected for roles over other data processing systems that may utilize composable hardware.

Proposal 232 may indicate which of data processing systems 112-113 are initially proposed (e.g., provisionally) to perform each of the roles (and/or groups of data processing systems to cooperatively perform roles, for roles that may be distributed across data processing systems).

Figure 2C:
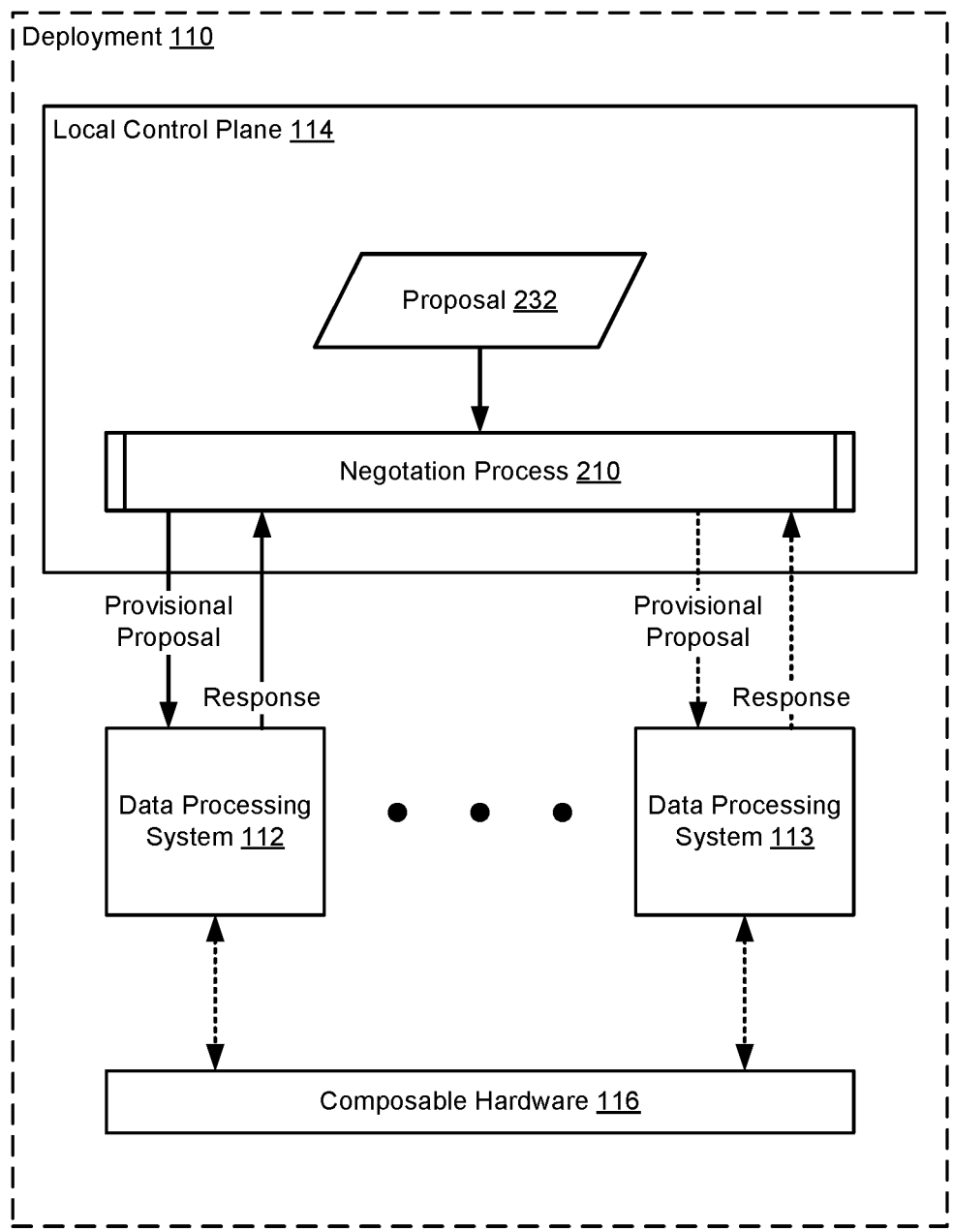

Turning to FIG. 2C, a third data flow diagram in accordance with an embodiment is shown. Using proposal 232, local control plane 114 may perform negotiation process 210 to ascertain which of data processing systems 112-113 will perform the roles. Negotiation process 210 may include, for one of the roles, sending a provisional proposal to the highest rank ordered data processing systems (e.g., 112). The provisional proposal may indicate that data processing system 112 is being requested to take on the role.

The data processing system may then accept or reject the provisional proposal. To decide whether to accept or reject the proposal, the data processing system may evaluate whether it is likely to be able to successfully perform the role. The data processing system may do so by evaluating an impact on its current roles (which it is already performing) for performing the proposed role. For example, the data processing system may evaluate the computing resources necessary to perform the role based on the hardware and/or software used to estimate its capability to perform the role, discussed above, and compare the computing resources to the available computing resources. If the required computing resources exceed the available computing resources, then the data processing system may elect to reject the role. In contrast, if the required computing resources are within the available computing resources, then the data processing system may elect to take on the role.

Once the decision is made, a response may be provided to local control plane 114. If rejected, negotiation process 210 may continue and a new provisional proposal may be made to the next highest ranked data processing system (e.g., 113, lines to and from data processing system 113 drawn in dashed lines to indicate that the provisional and response to data processing system 113 may or may not occur, depending on whether data processing system 112 accepted, in this example).

In the event that no data processing system accepts the provisional proposals, then a remediation process may be performed for the role. The remediation process may include decreasing the performance metrics for the role, reducing or eliminating ranking penalties for use of composable hardware 116, and/or opening the role to distributed performance by multiple data processing system. Additional provisional proposals may then be initiated until one or more data processing systems agree to the role.

Figure 2D:
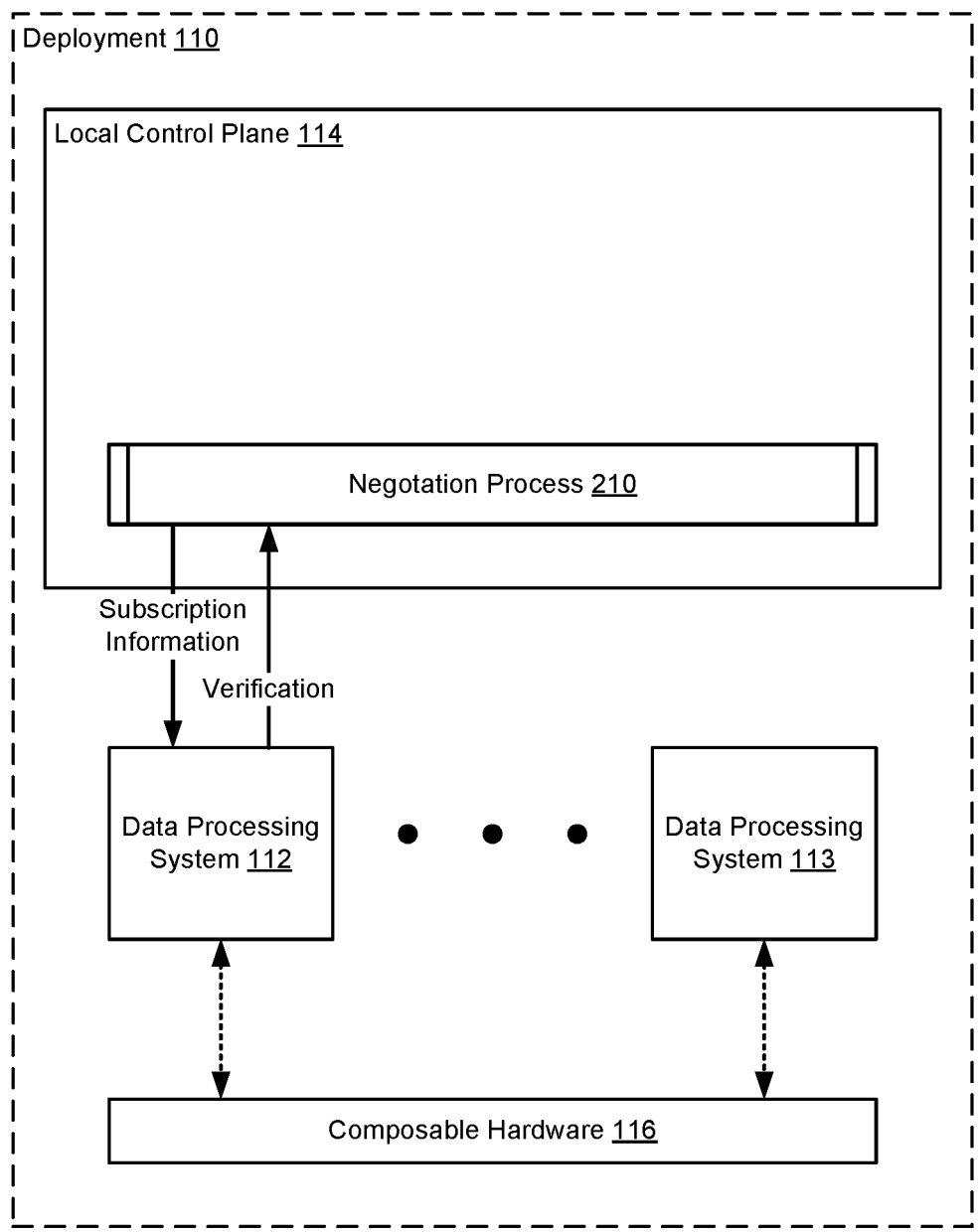

Turning to FIG. 2D, a fourth data flow diagram in accordance with an embodiment is shown. When a data processing system accepts the proposal, subscription information may be transmitted to the data processing system (illustrated in FIG. 2D with respect to data processing system 112, but could be any of the data processing systems). The subscription information may include information regarding when and under what conditions that the data processing system is to suspend or stop performing the role, which entities for which the role is to be performed (e.g., which client devices may utilize the services provided through the role), and/or other information usable to perform the role.

Once the subscription information is received, the data processing system may take action to perform the role. The actions may include, for example, any of (i) reconfiguring hardware components, (ii) acquisition of portions of composable hardware 116, (iii) deploying new software components, (iv) reconfiguring existing software components, (v) performing verification actions, and (vi) providing a verification to local control plane 114. The verification may indicate that the role is not being performed and also includes information usable to ascertain whether the role is being performed within the performance metrics for the role. For example, the verification actions may include performing testing to ascertain the data processing system's performance levels with respect to the performance metrics for the role.

To acquire the portions of composable hardware 116, adapter hardware of a data processing system may establish a communication channel to one or more hardware devices of composable hardware 116 (e.g., via a network), configure the hardware devices, establish any number of layers of local abstraction, and begin to emulate a bare metal hardware device operation to a processing complex of the data processing system. To acquire the portions of composable hardware 116, local control plane 114 may communicate with the adapter hardware via an out-of-band channel to provide the adapter hardware with information (e.g., instructions) usable to acquire control over hardware components of composable hardware 116 necessary to supply a host system with desired resources.

Figure 2E:
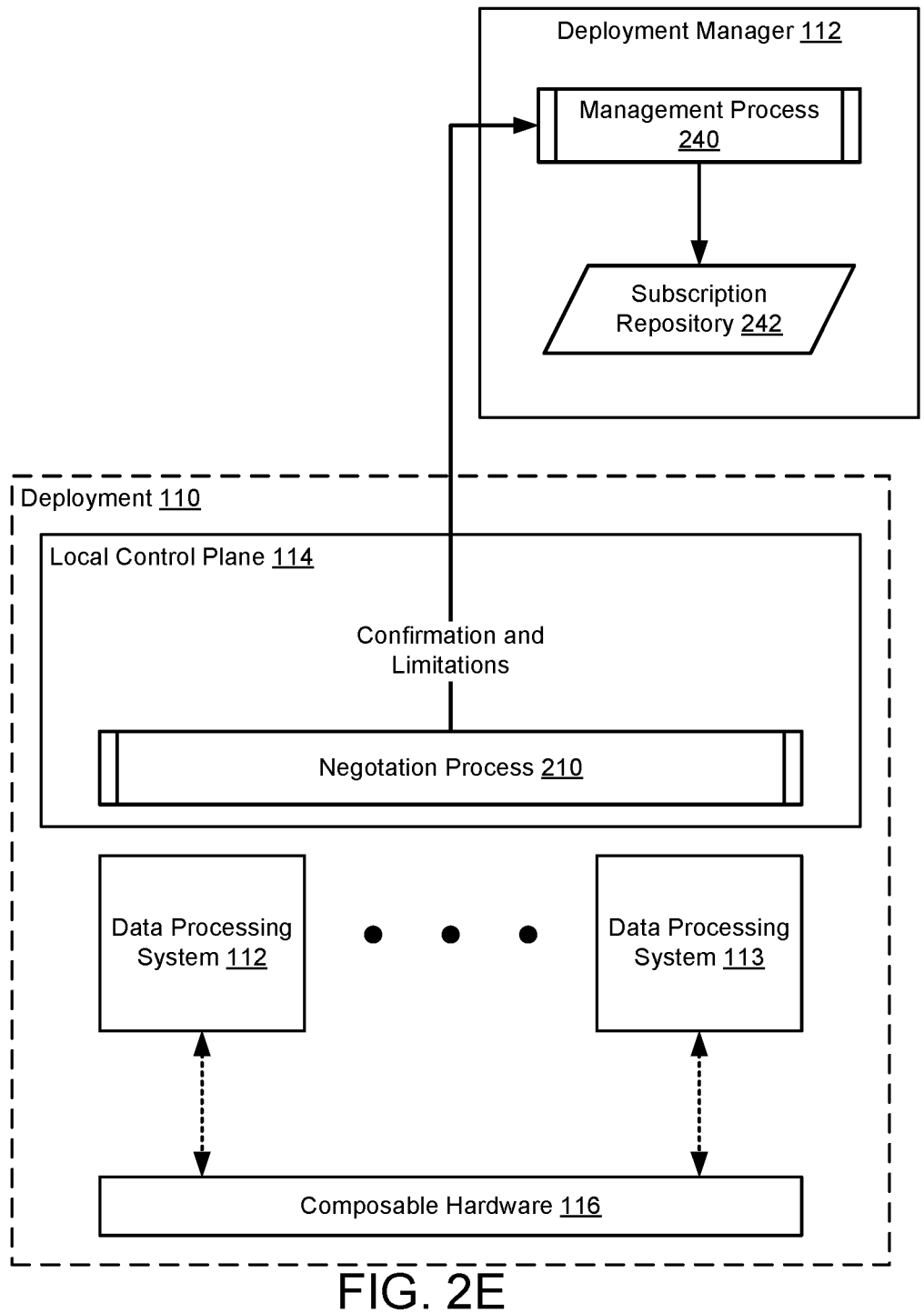

Turning to FIG. 2E, a fifth data flow diagram in accordance with an embodiment is shown. Based on a verification from a data processing system, negotiation process 210 may provide a confirmation regarding the role as well as any limitations for the role to deployment manager 106. For example, deployment manager 106 may perform a management process 240 that manages the functionalities requested by users of the clients. Management process 240 may process the confirmation and limitations to quantify whether a functionality is being provided in a manner consistent with a requestor of the functionality.

For example, management process 240 may maintain subscription repository 242. Subscription repository 242 may include information regarding the functionalities requested (e.g., subscribed to) by users of the clients. For a given functionality, management process 240 may track the confirmations and limitations from deployment 110. Management process 240 may compare, based on the confirmations and limitations, the extent to which a particular functionality is being provided to a user. Once the functionality meets metrics (e.g., when all of the roles of an intermediate representation corresponding to the function), then subscription repository 242 may be updated to reflect that a subscription for the functionality is now being satisfied.

Once a subscription is satisfied, then the use and performance of the functionality may be tracked to (i) confirm that the subscription for the functionality continues to be satisfied and (ii) identify whether any limits on the subscription (e.g., number of concurrent users, number of uses, duration of subscription, etc.) are exceeded. If any of the limits are exceeded, then management process 240 may confirm whether the data processing systems performing the roles for the subscription for the functionality have discontinued performing or otherwise modified their performance to limit the use of the subscription to be within the subscription limitations. Management process 240 may take action to modify the operation of the data processing systems if the data processing systems are exceeding the subscribed to level of the functionalities.

Figure 2F:
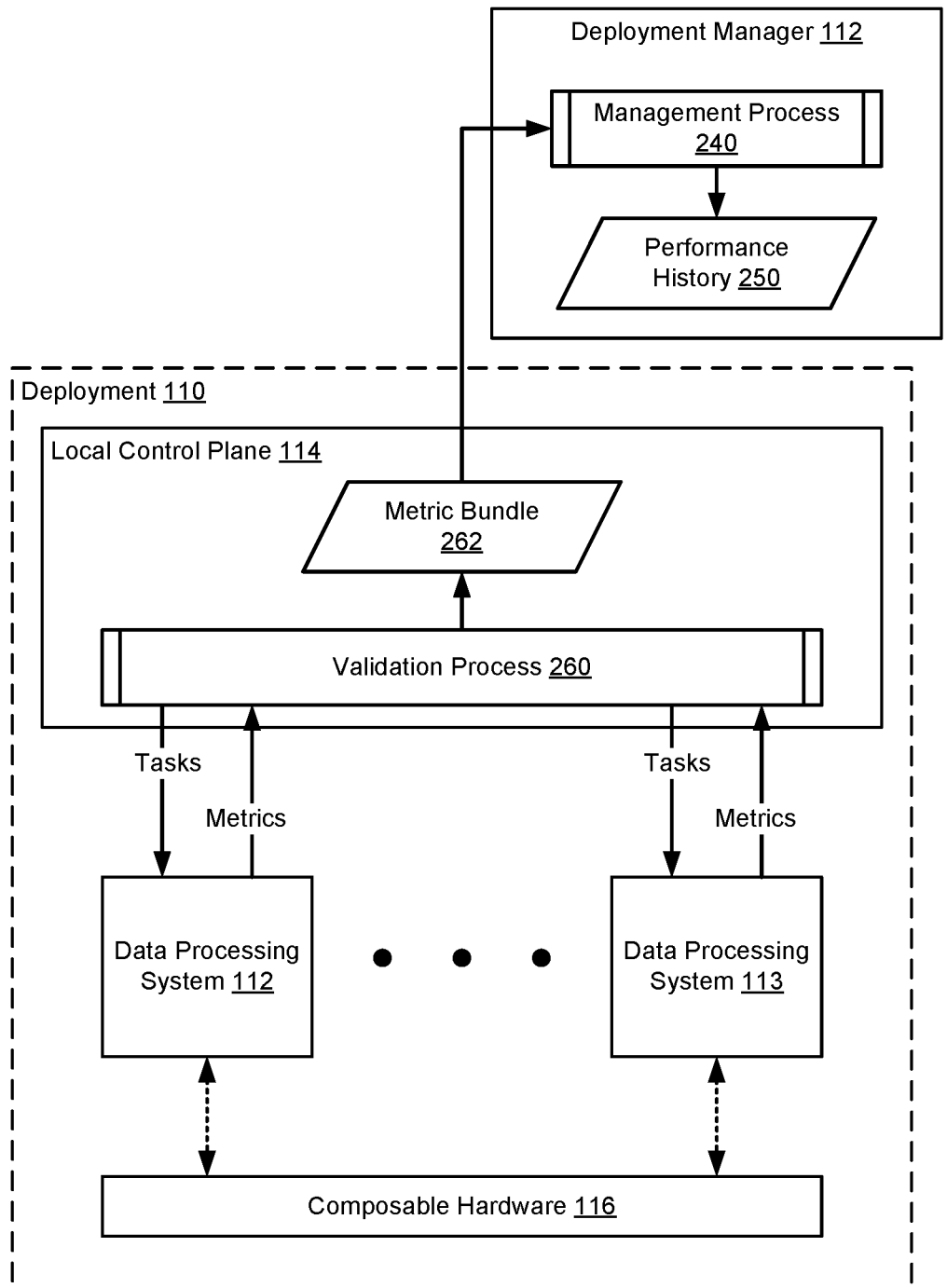

Turning to FIG. 2F, a sixth data flow diagram in accordance with an embodiment is shown. To identify whether any subscription limits have been exceeded, local control plane 114 may implement validation process 260. Validation process 260 may assign data collection tasks to data processing systems 112-113. The tasks may include monitoring performance of the roles assigned to data processing systems 112-113 to ascertain whether any of the subscription limitations have been exceeded. For example, the tasks may include monitoring of the computing resources consumed for performing the roles, the number of clients serviced by the roles, and/or other data collection processes to obtain metrics usable to ascertain whether subscription limitations have been exceeded.

The metrics may be collected by local control plane 114, aggregated, and provided to deployment manager 106 as metric bundle 262. Management process 240 may use metric bundle 262 to establish performance history 250. Performance history 250 may quantify the extent of use of the data processing systems for providing a functionality, the extent of use of the functionality by other devices, and/or otherwise establish a basis for ascertaining whether subscription limits have been exceeded and performance goals for a functionality are met.

Any of the processes described with respect to FIGS. 2A-2F may be implemented using any combination of software components (e.g., processes executing using computer processors) and/or non-programmable hardware components that include circuitry adapted to provide all, or a portion, of the functionality of the processes.

As discussed above, the components of FIG. 1 may perform various methods to manage a deployment. FIG. 3 illustrates examples of methods that may be performed by the components of FIG. 1. In the diagram discussed below and shown in FIG. 3, any of the operations may be repeated, performed in different orders, and/or performed in parallel with or a partially overlapping in time manner with other operations.

Turning to FIG. 3, a flow diagram illustrating a method of providing computer implemented service in accordance with an embodiment is shown. The method may be performed by a data processing system, a deployment manager, a client, and/or another component (e.g., not shown in FIG. 1).

At operation 300, intent data from a client that indicates a desired use is obtained. The desired use may be to receive a functionality of a deployment. The functionality may be provided through computer implemented services used by the client and provided by the deployment.

The intent data may be obtained from the client by (i) displaying a graphical user interface to the client that shows the available functionalities of the deployment, and (ii) receiving, via the graphical user interface, one or more user inputs indicating the intent from the client. The user inputs may be obtained, for example, by the user clicking on active elements (e.g., widgets, input boxes, etc.) of the graphical user interface. The input may indicate the functionalities to be provided, capacities and/or other characterizations regarding an extent of desired use of the functionalities, duration based and/or other types of limitations regarding the desired use, and/or other information indicating an intent of a user of the client. While described with respect to a graphical user interface, the intent of the client may be obtained via other methods without departing from embodiments disclosed herein.

At operation 302, an intermediate representation of roles to facilitate the desired use is obtained using the intent data. The intermediate representation may be obtained by translating the intent data into the intermediate representation. For example, the intent data may serve as one or more keys usable to perform a lookup in a data structure that associates the keys with roles and/or role identifiers. The intermediate representation may be obtained using the roles and/or role identifiers. For example, information regarding the roles and/or the role identifiers may be aggregated into a data structure (e.g., the intermediate representation).

At operation 304, self-reported role fit data is obtained from a portion of the data processing systems. The self-reported role fit data may indicate (i) estimates of the ability of each data processing system of the portion of the data processing systems to fulfill each of the roles, (ii) levels of dependence on composable hardware for the estimates, and/or (iii) other information reflecting how adoption of the role may be implemented by a data processing system The self-reported role fit data may be obtained by receiving it or otherwise obtaining it from the portion of the data processing systems.

For example, information regarding the roles may be provided to the data processing systems (e.g., such as a listing of the roles), the data processing systems may self-evaluate their abilities to perform the roles, and the data processing systems may self-report their role fit data based on their self-evaluation of the abilities to perform the roles.

Additionally, for each of the roles, the data processing systems may quantify and provide the quantification of their reliance on composable hardware when providing the roles.

Further, for any of the roles, the data processing systems may provide bifurcated estimates of their abilities to perform the roles when (i) only using native hardware, and (ii) using both native hardware and composable hardware. These estimates may allow, as will be discussed further below, management systems to better gauge whether a data processing system should adopt the roles and whether any restrictions (e.g., no use of composable hardware) will be imposed on how the roles is adopted (e.g., some roles may explicitly require that no composable hardware may be used in implementation while others may not include such restrictions).

At operation 306, a proposed deployment plan for services to be provided by each data processing system of the portion of the data processing systems is established based on the self-reported role fit data. The proposed deployment plan may be established through preferential selection for a set of the data processing systems of the portion of the data processing systems that have a level of dependence on composable hardware that falls below a threshold.

The deployment plan for the services may be obtained by rank-ordering the portion of the data processing system based on their self-reported role fit data for each role. The rank ordering may be obtained by (i) rank ordering based on the estimated abilities to perform each of the roles to obtain an initial rank ordering, (ii) adjustment of the initial rank ordering based on the level of dependence on composable hardware from the self-reported role fit data for each estimate upon which initial rank ordering is based to obtain a final rank order, and (iii) selection of data processing systems for the roles based on the final rank ordering. For example, the highest ranked data processing system for each role may be selected to provide the services associated with each of the roles.

The initial rank ordering may be adjusted by (i) excluding data processing systems from the rank order that have levels of dependence on composable hardware that exceed a threshold level or meet other type of quantification metrics, and/or (ii) by adjusting the rankings based on the levels of dependence on the composable hardware. For example, the ranks of each of the data processing systems that rely on composable hardware may be reduced based on the level of dependence on the composable hardware for the estimated ability level used to attain the ranking.

For example, consider a scenario where, for a role, a first data processing system self-reports its ability level as 80 out of 100 and level of dependence as 10 out of 100; a first data processing system self-reports its ability level as 75 out of 100 and level of dependence as 0 out of 100; and a third data processing system self-reports its ability level as 100 out of 100 and level of dependence as 35 out of 100. In this example, the data processing systems may be initially ranked as the third data processing system being the best (e.g., with a quantification of 100) and the second data processing system being the worst (e.g., with a quantification of 75). When adjusted, the data processing systems may be finally ranked as the second data processing system being the best (e.g., with an adjusted quantification of 75−0=75), the first data processing system being the second best (e.g., with an adjusted quantification of 80−10=70), and the third data processing system being the worst (e.g., with an adjusted quantification of 100−35=65). This process may be used to rank the data processing system with respect to each role, and each ranking being used to select the data processing system to perform each of the roles.

At operation 308, agreements with the portion of the data processing systems to implement at least one of the roles is negotiated using the proposed deployment plan. The agreements may be negotiated by, for a role, generating and sending a provisional proposal to the best ranked data processing system, and receiving a response based on the provisional proposal. If the response is affirmative, then an agreement may be reached and the data processing system that provided the response may be selected for the role. If the response is negative, then the next highest ranked data processing system may receive the provisional proposal, and the response from the next highest ranked data processing system may be received and evaluated similarly. This process may continue until a data processing system responds in the affirmative, or no data processing system responds in the affirmative.

If no data processing systems respond in the affirmative, then the quality metrics for the role may be adjusted, the data processing systems may be re-ranked without adjustment based on level of dependence on composable hardware, and/or the process may be repeated. The quality metrics may be lowered via the adjustment thereby allowing a data processing system that does not meet the quality metrics to agree to take on the role. By re-ranking the data processing system without consideration for the level of dependence on composable hardware, other data processing systems may If no data processing systems respond in the affirmative, then the aforementioned process may be repeated, but for distributed implementations of the role where multiple data processing systems may provide the roles.

At operation 310, subscriptions for the data processing systems are instantiated to implement the roles to facilitate the desired use to obtain subscribed data processing systems.

The subscriptions may be instantiated by, for example, (i) verifying that the data processing systems that have agreed to the roles have implemented any software and/or hardware changes to take on the role (e.g., using the software and/or hardware configurations through which the self-evaluations with respect to the ability each of each data processing system to perform the roles), (ii) validating the extent to which the data processing systems actually perform the services associated with each of the roles, (iii) when satisfactorily evaluated, deploying subscription information to the data processing systems, the subscription information may provide criteria through which the data processing systems evaluate whether subscription limitations have been exceeded, and/or (iv) recording the subscriptions as being serviced in management systems.

For data processing systems that implement roles using composable hardware, the adapter hardware of the data processing systems may secure use of a portion of the composable hardware to facilitate performance of the role. Once secured, similar validation processes may be performed to ensure that the services associated with the roles are provided commensurate with the roles.

At operation 312, the desired use of the data processing systems is provided to the client using the subscribed data processing systems. The desired use may be provided through the operation of the subscribed data processing systems.

The method may end following operation 312.

Using the method illustrated in FIG. 3, embodiments disclosed herein may provide a distributed system that is better able to provide desired services at a lower computational overhead when compared to systems that use rigid central management modalities and/or fixed configurations for systems to provide services. Additionally, to provide for flexibility in implementation, data processing systems that may use native hardware to perform roles may be preferentially selected for role performance over other data processing systems that may propose to use composable hardware to perform the roles. Thus, embodiments disclosed herein may address, among others, the technical challenge of using data processing systems to provide services in distributed systems where top-down management may result in great inefficiencies of use of data processing systems (e.g., data processing systems that do not meet rigid configurations for providing services may be ignored) and flexibility in implementation may lead to squandering of highly configurable resources that may otherwise be used to buttress a system's ability to perform multiple roles.

Figure 4:
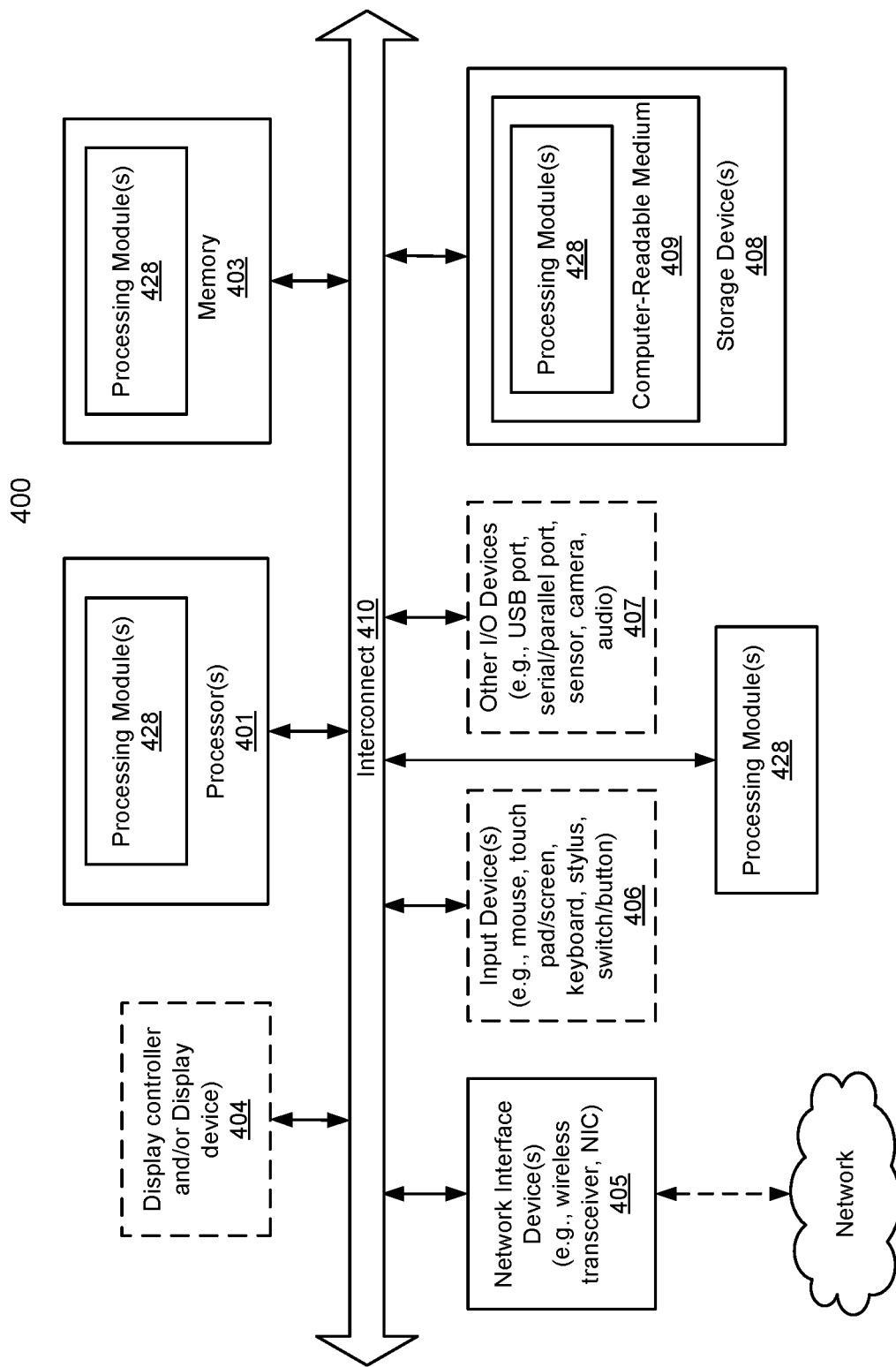
FIG. 4 shows a block diagram illustrating a data processing system in accordance with an embodiment.

Any of the components illustrated in FIGS. 1-2F may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments as described herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for managing services provided using data processing systems, the method comprising:
　generating an intermediate representation of roles to facilitate a desired use of the data processing systems;
　receiving, using a local control plane of one or more data processing systems among the data processing systems and using the intermediate representation, self-reported role fit data from the one or more data processing systems, the self-reported role fit data indicating:
　　estimates of an ability of each of the one or more data processing systems to fulfill each of the roles, and
　　a level of dependence on composable hardware for the estimates;
　deploying, based on a proposed deployment plan for services to be provided by each of the one or more data processing systems, subscriptions to the one or more data processing systems to implement the roles to facilitate the desired use of the one or more data processing systems resulting in one or more subscribed data processing systems, wherein the proposed deployment plan is based on the role fit data, and wherein the proposed deployment plan is associated with one or more of the data processing systems with a level of dependence on the composable hardware for the estimates that falls below a threshold for the roles; and
　providing the desired use of the data processing systems to a client using the one or more subscribed data processing systems.

2. The computer-implemented method of claim 1, further comprising:
　implementing at least one of the roles, wherein the subscriptions are based on negotiated agreements with the one or more data processing systems, and wherein the negotiated agreements are based on the proposed deployment plan.

3. The computer-implemented method of claim 1, further comprising:
receiving one or more user inputs indicating intent data from the client, the intent data indicating a desired use of the data processing systems, wherein the intermediate representation of the roles is based on the intent data.

4. The computer-implemented method of claim 1, wherein
for a role of the roles:
one of the data processing systems of the one or more data processing systems is based on a revised ranking of a plurality of revised rankings, wherein a first revised ranking is based on the levels of dependence corresponding to each of the estimates of the ability of each of the one or more data processing system for the role.

5. The computer-implemented method of claim 4, wherein
the plurality of the revised rankings are based on a sub-portion of the one or more data processing systems, the sub-portion being associated with estimated abilities that are above the threshold for the roles.

6. The computer-implemented method of claim 4, wherein
the revised ranking of the plurality of revised rankings of the one or more data processing systems
is further based on the level of dependence of the levels of dependence corresponding to the estimates of the ability of each of the one or more data processing systems.

7. The computer-implemented method of claim 1, wherein receiving the self-reported role fit data comprises:
providing, to the one or more data processing systems, the roles;
and
providing, by the one or more data processing systems, the self-reported role fit data based on a first viability for each of the roles and a second viability for each of the roles, wherein the first viability is based on static hardware and the second viability is based on the static hardware and the composable hardware.

8. A non-transitory machine-readable medium having instructions stored therein, which when executed by a processor, cause the processor to perform operations for managing services provided using data processing systems, the operations comprising:
generating an intermediate representation of roles to facilitate a desired use of the data processing systems;
receiving, using a local control plane of one or more data processing systems among the data processing systems and using the intermediate representation, self-reported role fit data from the one or more data processing systems, the self-reported role fit data indicating:
estimates of an ability of each of the one or more data processing systems to fulfill each of the roles, and
a level of dependence on composable hardware for the estimates;
deploying, based on a proposed deployment plan for services to be provided by each of the one or more data processing systems, subscriptions to the one or more data processing systems to implement the roles to facilitate the desired use of the one or more data processing systems resulting in one or more subscribed data processing systems, wherein the proposed deployment plan is based on the role fit data, and wherein the proposed deployment plan is associated with one or more of the data processing systems with a level of dependence on the composable hardware for the estimates that falls below a threshold for the roles; and
providing the desired use of the data processing systems to a client using the one or more subscribed data processing systems, wherein the non-transitory machine-readable medium comprises at least one selected from a group consisting of: a solid-state memory, read only memory, random access memory, magnetic disk storage media, optical storage media, and flash memory.

9. The non-transitory machine-readable medium of claim 8, wherein the operations further comprise:
implementing at least one of the roles, wherein the subscriptions are based on negotiated agreements with the one or more data processing systems, and wherein the negotiated agreements are based on the proposed deployment plan.

10. The non-transitory machine-readable medium of claim 8, wherein the operations further comprise:
receiving one or more user inputs indicating intent data from the client, the intent data indicating a desired use of the data processing systems, wherein the intermediate representation of the roles is based on the intent data.

11. The non-transitory machine-readable medium of claim 8, wherein
for a role of the roles:
one of the data processing systems of the one or more data processing systems is based on a revised ranking of a plurality of revised rankings, wherein a first revised ranking is based on the levels of dependence corresponding to each of the estimates of the ability of each of the one or more data processing system for the role.

12. The non-transitory machine-readable medium of claim 11, wherein
the plurality of the revised rankings are based on a sub-portion of the one or more data processing systems, the sub-portion being associated with estimated abilities that are above the threshold for the roles.

13. The non-transitory machine-readable medium of claim 11, wherein
the revised ranking of the plurality of revised rankings of the one or more data processing systems
is further based on the level of dependence of the levels of dependence corresponding to the estimates of the ability of each of the one or more data processing systems.

14. The non-transitory machine-readable medium of claim 8, wherein receiving the self-reported role fit data comprises:
providing, to the one or more data processing systems, the roles;
and
providing, by the one or more data processing systems, the self-reported role fit data based on a first viability for each of the roles and a second viability for each of the roles, wherein the first viability is based on static hardware and the second viability is based on the static hardware and the composable hardware.

15. A data processing system, comprising:
a processor; and a memory coupled to the processor to store instructions, which when executed by the processor, cause the processor to perform operations for managing services provided using data processing systems comprising the data processing system, the operations comprising:
generating an intermediate representation of roles to facilitate a desired use of the data processing systems;
receiving, using a local control plane of one or more data processing systems among the data processing systems and using the intermediate representation, self-reported role fit data from the one or more data processing systems, the self-reported role fit data indicating:
estimates of an ability of each of the one or more data processing systems to fulfill each of the roles, and
a level of dependence on composable hardware for the estimates;
deploying, based on a proposed deployment plan for services to be provided by each of the one or more data processing systems, subscriptions to the one or more data processing systems to implement the roles to facilitate the desired use of the one or more data processing systems resulting in one or more subscribed data processing systems, wherein the proposed deployment plan is based on the role fit data, and wherein the proposed deployment plan is associated with one or more of the data processing systems with a level of dependence on the composable hardware for the estimates that falls below a threshold for the roles; and
providing the desired use of the data processing systems to a client using the one or more subscribed data processing systems.

16. The data processing system of claim 15, wherein the operations further comprise:
receiving one or more user inputs indicating intent data from the client, the intent data indicating a desired use of the data processing systems, wherein the intermediate representation of the roles is based on the intent data.

17. The data processing system of claim 15, wherein for a role of the roles:
one of the data processing systems of the one or more data processing systems is based on a revised ranking of a plurality of revised rankings, wherein a first revised ranking is based on the levels of dependence corresponding to each of the estimates of the ability of each of the one or more data processing system for the role.

18. The data processing system of claim 17, wherein the plurality of the revised rankings are based on a sub-portion of the one or more data processing systems, the sub-portion being associated with estimated abilities that are above the threshold for the roles.

19. The data processing system of claim 17, wherein the revised ranking of the plurality of revised rankings of the one or more data processing systems
is further based on the level of dependence of the levels of dependence corresponding to the estimates of the ability of each of the one or more data processing systems.

20. The data processing system of claim 15, wherein receiving the self-reported role fit data comprises:
providing, to the one or more data processing systems, the roles;
and
providing, by the one or more data processing systems, the self-reported role fit data based on a first viability for each of the roles and a second viability for each of the roles, wherein the first viability is based on static hardware and the second viability is based on the static hardware and the composable hardware.

* * * * *